United States Patent [19]

Lemonnier

[11] Patent Number: 5,112,488
[45] Date of Patent: May 12, 1992

[54] FILTER MEMBRANE SUPPORT AND FILTRATION FUNNEL

[75] Inventor: Jean Lemonnier, Le Vesinet, France

[73] Assignee: Millipore Corporation, Bedford, Mass.

[21] Appl. No.: 717,241

[22] Filed: Jun. 17, 1991

[30] Foreign Application Priority Data

Jun. 28, 1990 [FR] France .................. 90 08171

[51] Int. Cl.[5] .................................. B01D 61/20
[52] U.S. Cl. .................. 210/541; 210/542; 422/101; 435/311
[58] Field of Search ........ 210/236, 644, 645, 649–652, 210/634, 224, 226–231, 257.2, 321.6, 321.72, 321.75, 321.84, 445, 446, 450, 451, 453, 455, 473, 500.21, 541, 542; 422/101; 435/311

[56] References Cited

U.S. PATENT DOCUMENTS 4,317,726  3/1982  Shepel .................. 210/236

Primary Examiner—Frank Sever
Attorney, Agent, or Firm—Andrew T. Karnakis; Paul J. Cook

[57] ABSTRACT

The instant invention provides a support apparatus for a filter membrane which comprises a central porous support section and a peripheral support section, said central porous support section adapted to support a central portion of a filter membrane and said peripheral support section adapted to support a peripheral portion of a filter membrane, a base support for said central support section and said peripheral support section, and means to separate said central porous support section from said peripheral support action thereby to separate said peripheral portion of said filter membrane from said peripheral support section.

24 Claims, 8 Drawing Sheets

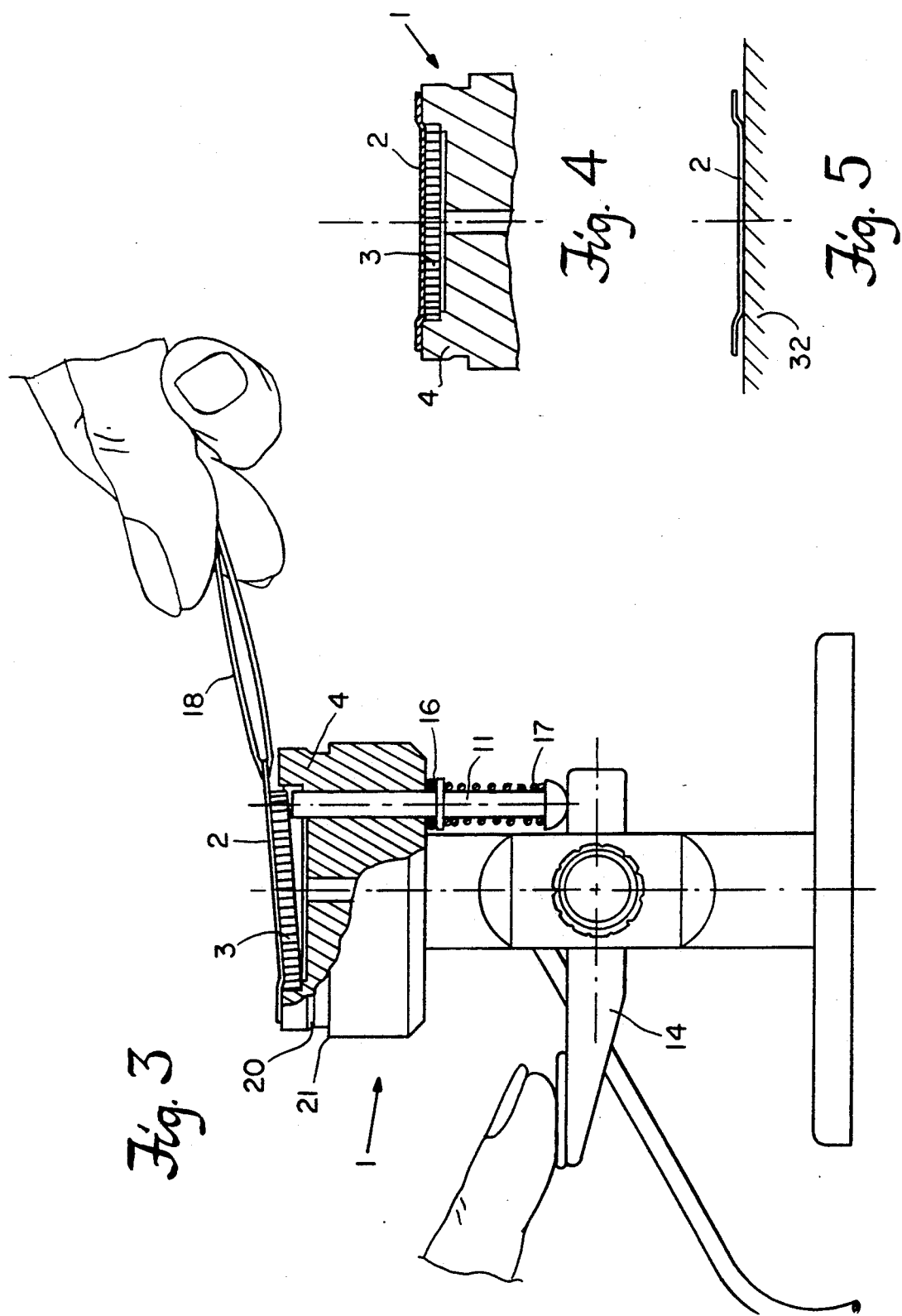

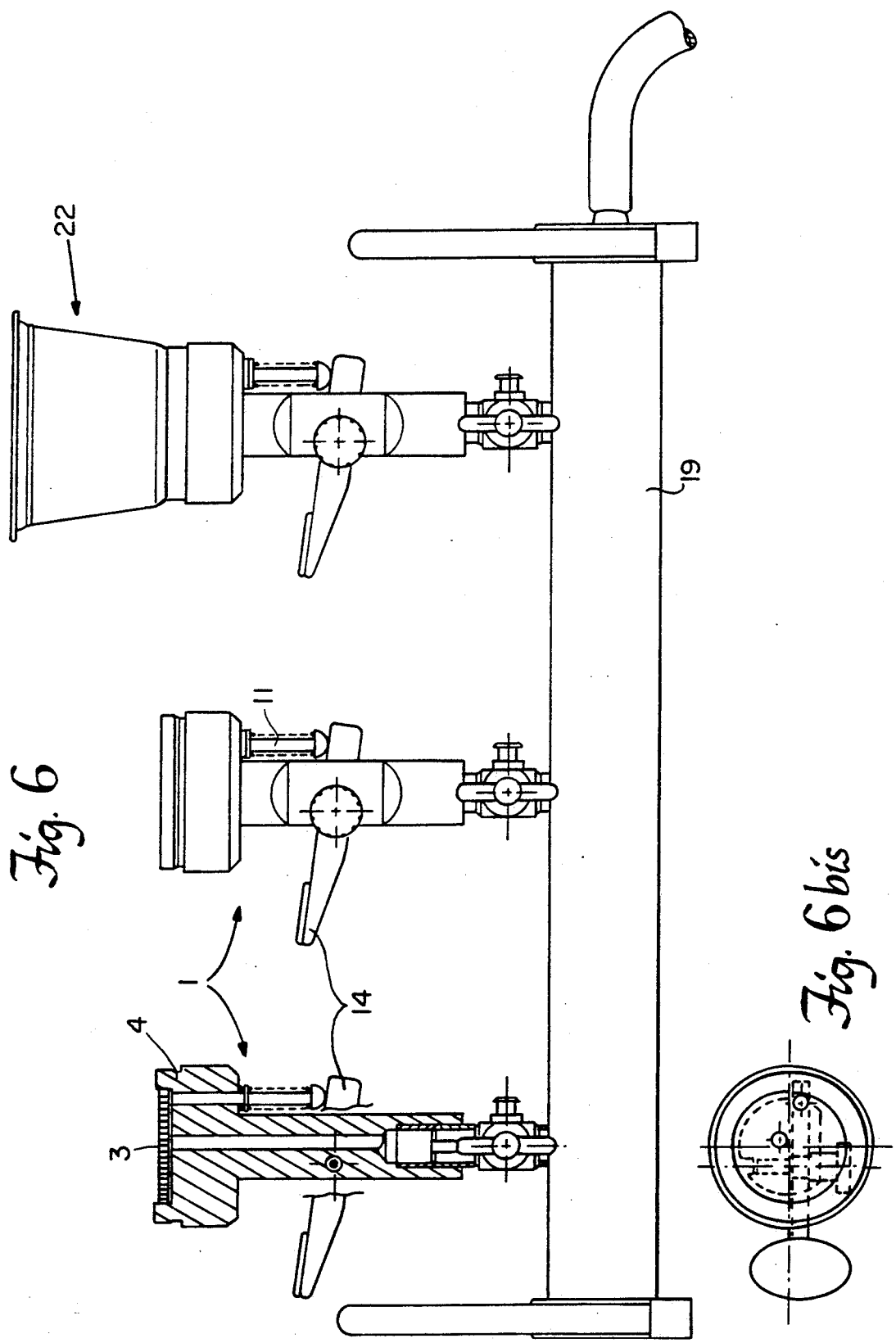

FILTER MEMBRANE SUPPORT AND FILTRATION FUNNEL

BACKGROUND OF THE INVENTION

The present invention relates to an apparatus for filtering liquid samples to effect microbiological analysis thereof.

Bacteria, mold and especially yeast are a permanent threat to the quality, stability and taste of liquids, including drinks, medicines and cosmetics. They are found in practically all environments including in the raw materials, on the surfaces of apparatus and in the air. mold cannot grow in non-alcoholic drinks once the manufacture is completed, but they can prosper in water and in sugar syrups, in which they cause strong smells and a disagreeable taste. High bacteria counts in the finished product indicate non-hygenic packaging that requires modification. The characteristic aspects of contamination by yeast are a white deposit at the bottom of the container as well as changes in taste and smell.

The preferred method for preventing the development of contamination, which represents a risk to the consumer and to the quality of the product, is to adopt a program of regular sampling and testing at key points in the production system. A systematically executed program of sampling and analyses enables the manufacturer to contain and remedy any such contamination at the source before it develops into a major problem.

Currently there are available many types of single use or reusable apparatus for carrying out this type of sampling and analysis, with a greater or lesser degree of ease of use.

The method most commonly used at present and recommended by French and US standards entails clamping a 47 mm diameter circular filter membrane having a pore size of 0.45 $\mu$m between the smooth edges of a funnel and a circular support having a porous central surface, placing this filter system on a vacuum manifold or conical flask, pouring the sample into the funnel and vacuum filtering it to recover any microorganisms on the membrane. After filtration the funnel is rinsed with distilled water or a phosphate buffer to recover all of the microorganisms and to eliminate from the filter membrane itself any bacteriostatic agents which could falsify the results. The filter membrane is then removed, placed on a culture medium specific to the microorganism under test and allowed to incubate. After a specific incubation period, colonies form on the surface of the filter that are easy to count and identify. A major difficulty of this known method is manipulating the extremely fragile filter membrane, especially when detaching it from the support after filtration. When it is wet it is in perfect contact with the support, whose peripheral surface is generally coated with polytetrafluoroethylene to reduce the adhesion of the membrane to its support. However, it is still difficult to detach it from the support and especially to grasp it by its edge using tweezers without damaging it or deforming it during handling.

SUMMARY OF THE INVENTION

An object of the present invention is to provide an improved apparatus used to support a filter membrane such as a microporous or ultrafiltration membrane and to receive a sample to be analyzed, with a view to facilitating handling of the wet membrane by an operator.

This invention comprises a two-part support for a filter membrane comprising a central section and a peripheral section, characterized in that the two sections can be separated by means providing access to the edge of the membrane as a result of axial tilting or displacement of one section of the support relative to the other section.

The apparatus comprises for example, a retractable sliding ring or a series of plungers enabling axial movement of a peripheral section of the support relative to the central section.

Alternatively this invention comprises a plunger tilting the central section of the membrane support in the upstream direction (in the sense of the direction of fluid flow). The central section of the membrane support is preferably a circular drainage section made from a perforated or sintered material and having a diameter that is less than that of the filter membrane. The peripheral section of the membrane support preferably has a roughened upper surface. The peripheral surface of the filter membrane mates with this roughened surface during vacuum filtering to provide a seal while the reliefs of this roughened surface break the vacuum, without any manual opening of any valve, immediately after the peripheral edges of the membrane are no longer clamped to this surface.

Provision can be made for movement of the upper surface of the central section of the membrane support in the downstream direction relative to the parallel upper surface of the peripheral section of the support, to enable the filter membrane to deform slightly during vacuum filtering to produce a convex lower surface favoring good contact when deposited on a culture medium.

Another object of the present invention is to provide a funnel adapted to cooperate with the support as previously defined. This funnel is adapted to receive the liquid sample to be filtered on the membrane and is characterized by a frustoconical right cross-section having a smaller base, situated at its lower end, a flexible sealing lip extending radially towards the axis of the funnel and adapted to grip the peripheral section of the membrane. It is also characterized by a device for fixing the funnel to the support. The fixing device preferably is a device for engaging a locking ring disposed inside a cylindrical protective skirt extending the narrower bottom end of the funnel, on the side opposite the frustoconical part and cooperating with an external circular groove on the support. The outside diameter of this cylindrical protective skirt is less than the inside diameter of the smaller base of the frustoconical part, to enable funnels to be stacked one inside the other without compressing their frustoconical part. Such stacking without compression enables them to be loaded in vertical stacks into an automatic dispenser. Each funnel may be provided at its larger base, positioned at its open upper end, with a stiffener ring facilitating handling it and dispensing it from a dispensing machine. The open lower end of the funnel enables it to be disposed around an ultra-violet lamp which maintains the interior of the funnel sterile immediately before use, if desired. The inside walls of the frustoconical part of the funnel are preferably polished and the upper surface of the flexible sealing lip is preferably roughened so as to modify the surface tension of the liquid and to facilitate flow of the sample to be analyzed.

BRIEF DESCRIPTION OF THE DRAWINGS

FIG. 3 shows the support of FIGS. 1 and 2 with the two sections separated by a plunger;

FIG. 4 is a cross-sectional view showing the filter membrane resting on the two section of the support in accordance with the invention.

FIG. 5 illustrates the filter membrane deposited on a culture medium.

FIG. 6 illustrates a battery of filter devices with supports in accordance with the invention disposed on a vacuum manifold.

FIG. 6b is a plan view of the support.

DESCRIPTION OF SPECIFIC EMBODIMENTS

Figure 1:
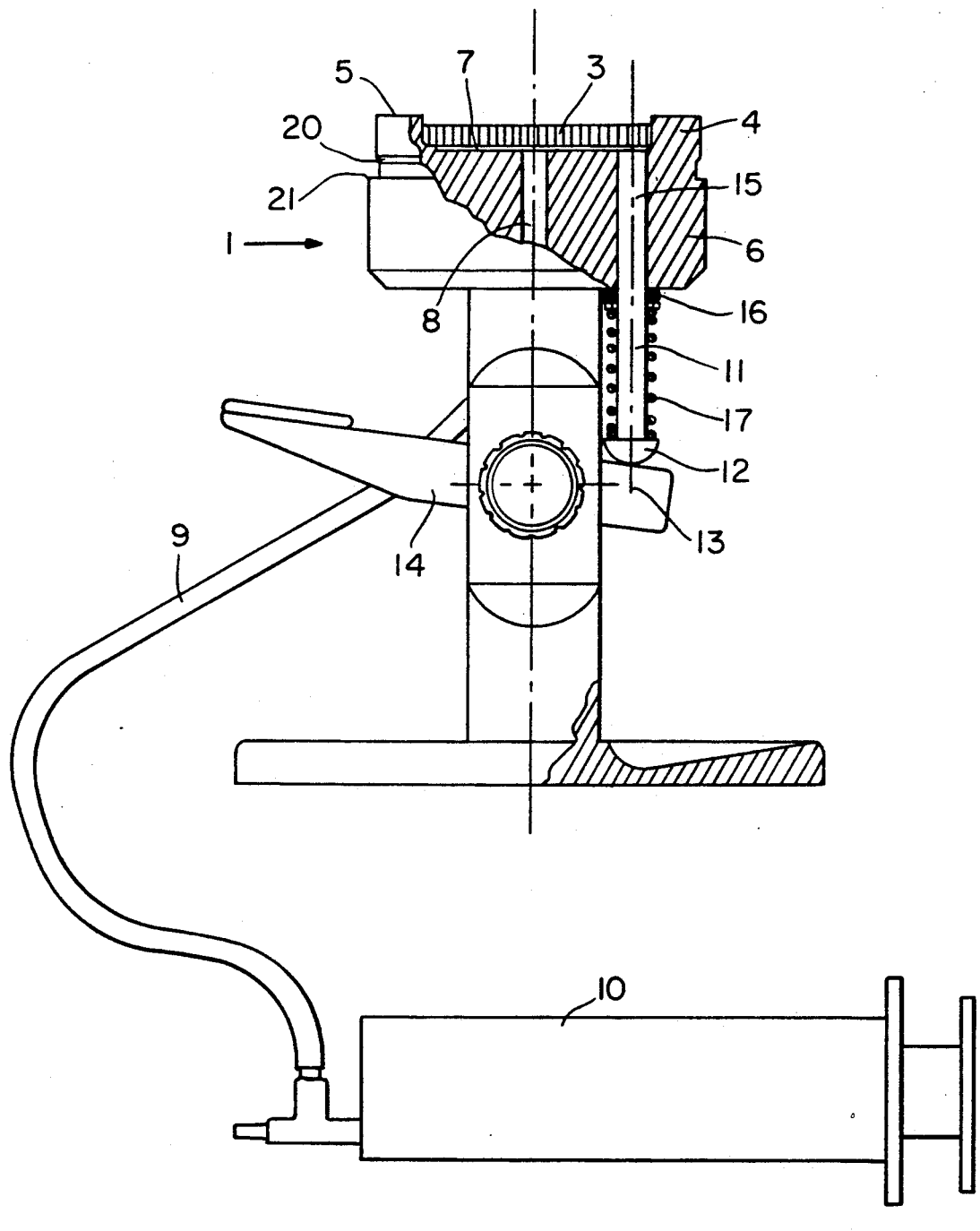
FIG. 1 is a view in elevation and partly in cross-section of one specific embodiment of the support in accordance with the invention.

The support 1 in accordance with the invention for a circular filter membrane 2 is shown in FIGS. 1 through 4 and 6.

The support 1 comprises a vertical axis pedestal on which is disposed a circular plate 6 with a central recess 7 and an axial bore 8 connected to an evacuation system comprising a flexible pipe 9 and a two-way syringe 10. The support 1 includes a circular central section 3 and a ring-shaped peripheral section 4 surrounding the central section 3, both supporting the filter membrane 2. The central section 3 of the support 1 is in the form of a removable disk which is made porous and which can be plastic, metal or glass to enable a liquid sample which has passed through the membrane 2 to drain away. This central support 3 is positioned inside the peripheral support section 4. The upper surfaces of each of the two support sections 3 and 4 are in different but parallel planes so that the central section 3 is slightly downstream of the peripheral section 4 relative to the direction of flow of the liquid to be analyzed. The upper surface 5 of the peripheral support section 4 on which the edges of the filter membrane 2 rest is given an appropriate surface treatment to roughen it.

The support 1 also includes a finger-like plunger 11 with its axis parallel to that of the support 1 and with one end 12 resting on the arm 13 of a lever 14 and its other end 15 positioned flush with the lower surface of the central support section 3, near the circumference of the latter, as best shown in FIG. 1. The plunger 11 can be moved axially to separate the central support section 3 from the peripheral support section 4 with a tilting motion, as best shown in FIG. 3. The plunger 11 is fitted with an external seal 15 and is normally held in the rest position shown in FIG. 1, with a coil spring 17 urging it downwards at all times so that the upper surfaces of the central and peripheral support sections 3 and 4 are essentially parallel. By depressing the arm of the lever 14 opposite that on which the end 12 of the plunger 11 rests causes axially upward movement of the plunger 11 and effects tilting of the central section 3 and release of the edge of the filter membrane 2. The filter membrane 2 then can be easily grasped with tweezers 18 as best shown in FIG. 3.

The pivot pin of the lever 14 can be screwed to the pedestal so that the lever 14 can be easily removed for proper cleaning of the support 1.

Figure 2:
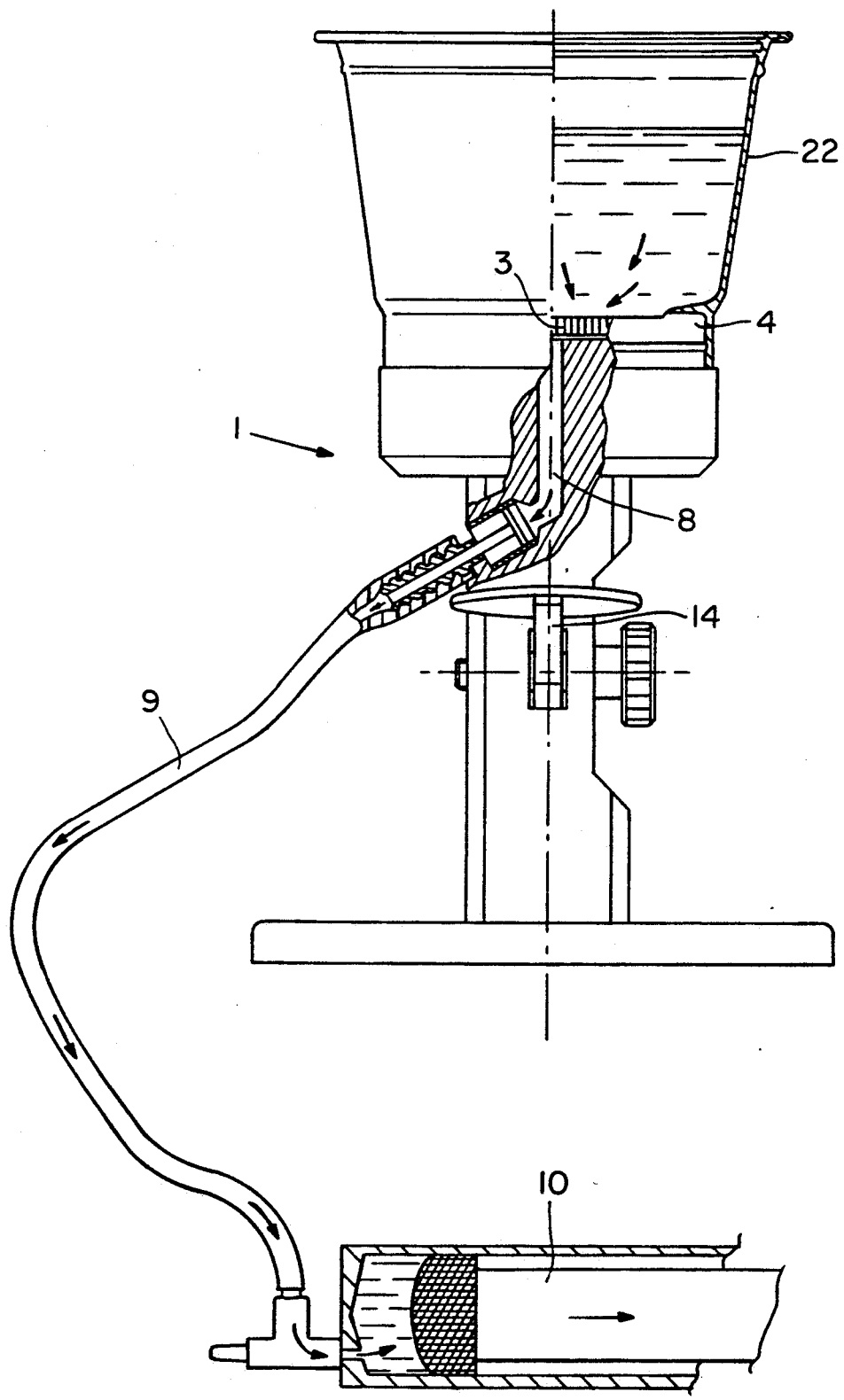
FIG. 2 is a front view, partly in cross section of the support shown in FIG. 1, fitted with a funnel.
Figure 7:
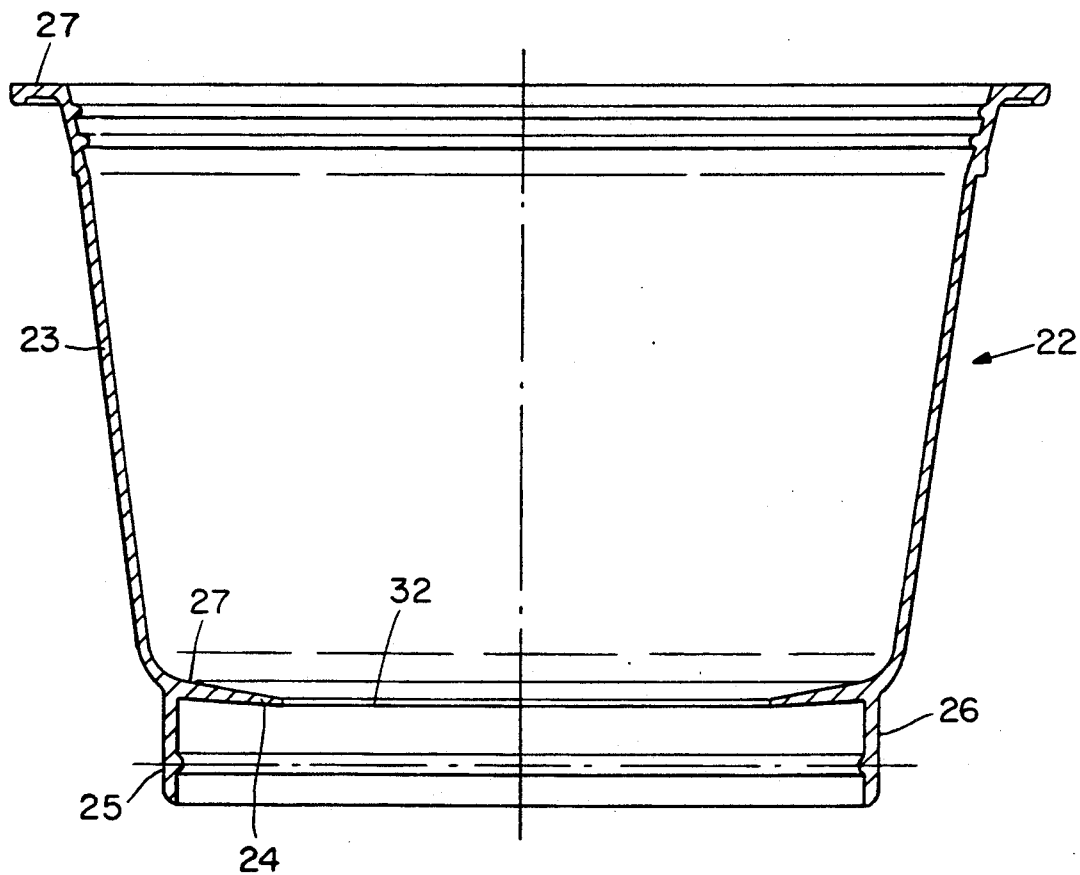
FIG. 7 illustrates a funnel in accordance with the invention in cross-section.

The axial bore 8 can be connected either to the flexible pipe 9 and the syringe 10 as best shown in FIGS. 1 and 2 or to a conventional laboratory vacuum manifold 19 as best shown in FIG. 6.

The circular plate 6 to which the peripheral support part 4 is attached (in this embodiment they are in one piece) incorporates an external circular groove 20 and a lip 21 in planes essentially parallel to the upper surfaces of the central and peripheral support sections 3 and 4 and downstream of the latter. Their function will be described in more detail below.

The funnel 22 in accordance with the invention is best shown in FIGS. 2 and 6 through 11. It will be described with particular reference to FIG. 7. The funnel 25 is designed for filtering a liquid sample on a filter membrane 2 disposed on a support 1 and has a frustoconical right cross-section 23 in which the smaller base, at the lower end, has a flexible sealing lip 24 extending radially towards the axis of the funnel 22 and adapted to immobilize the edges of the filter membrane 2 on the peripheral section 4 of the support. The inside diameter 32 of the flexible sealing lip 24 defines an axial opening with a diameter that is preferably at least 35 mm to enable the insertion of a standard ultra-violet lamp for maintaining sterile conditions inside the funnel 22. Although the inside walls of the funnel 22 are smooth the upper surface 27 of the sealing lip 24 is roughened to facilitate the flow of the liquid to be analyzed.

Figure 8:
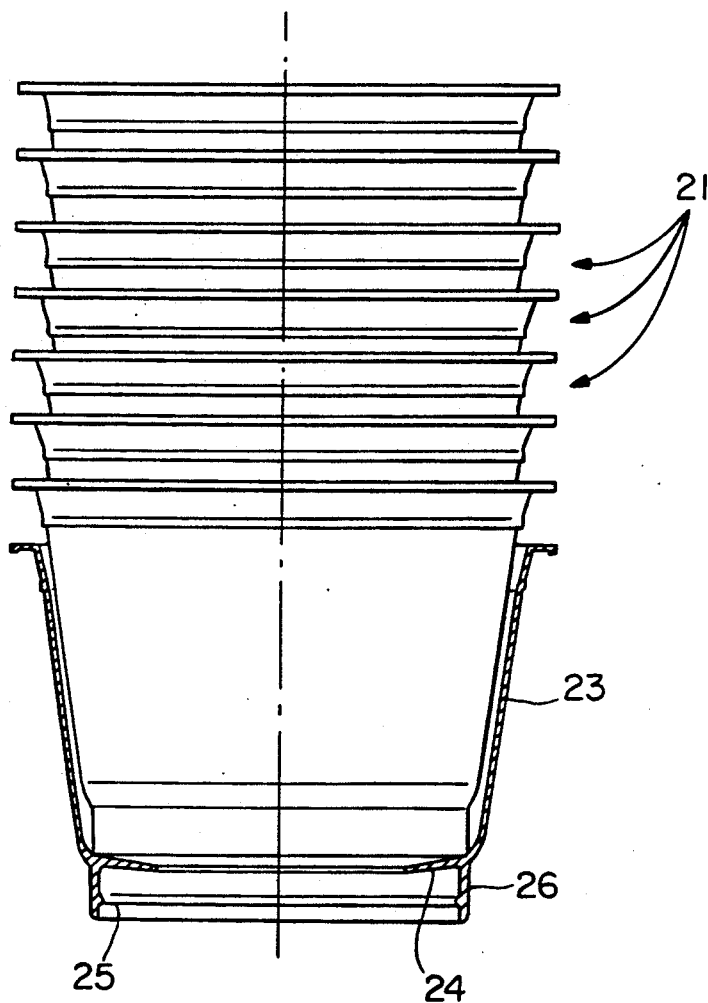
FIG. 8 illustrates a series of funnels as in FIG. 7 stacked by nesting relationship.

The funnel 22 is also provided with a device for fixing it to the support 1. This device is a snap fastening and comprises a locking ring 25 in a plane perpendicular to the funnel axis and inside a cylindrical protective skirt 26 extending the narrower bottom end of the funnel 23 away from the frustoconical part 23 and adapted to cooperate with the external circular groove 20 on the support, the end of the skirt 26 being in contact with the rim 21. The outside diameter of the skirt 26 is less than the inside diameter of the smaller base of the frustoconical part 23 of the funnel 22 to enable funnels to be stacked inside each other nesting fashion without crushing their frustoconical parts 23, as best shown in FIG. 8. The open upper end of the funnel 22, defined by the larger base of the frustoconical part 23, preferably incorporates an external stiffener ring 27 which facilitates handling the funnel 22 and retaining it in a dispenser 30.

Figure 9:
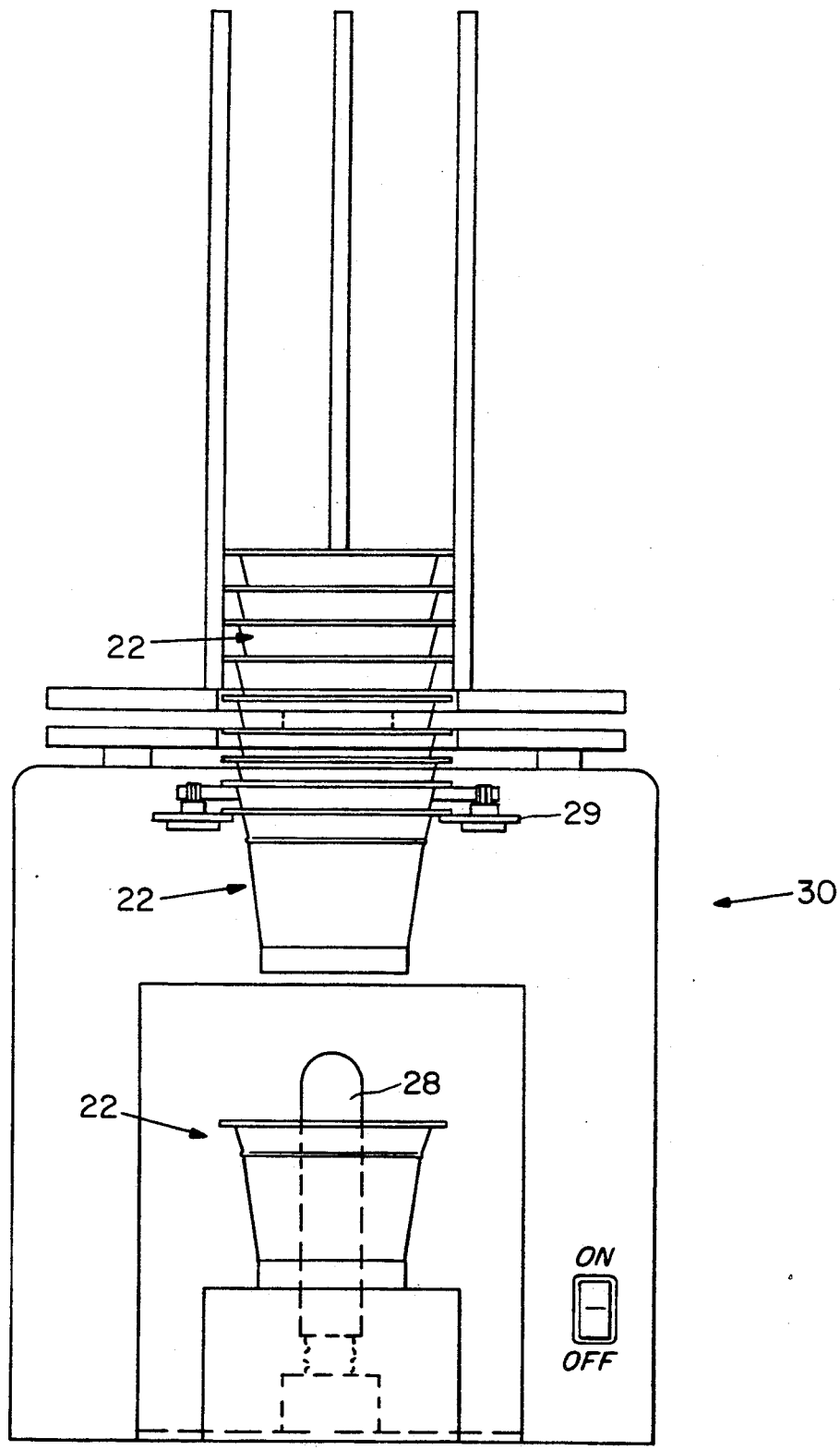
FIG. 9 illustrates a dispenser for funnels as in FIG. 7.
Figure 10:
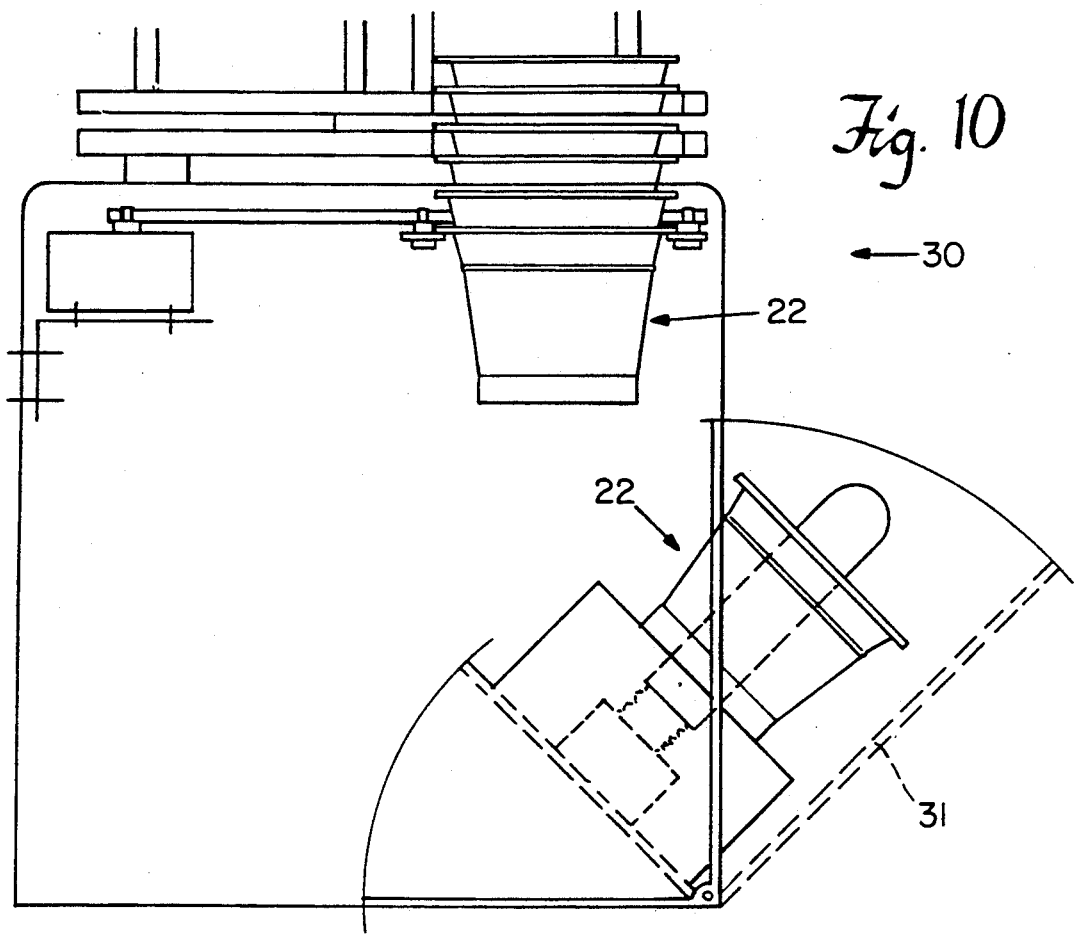
FIGS. 10 and 11 are respectively a bottom view and a top view of the dispenser of FIG. 9.
Figure 11:
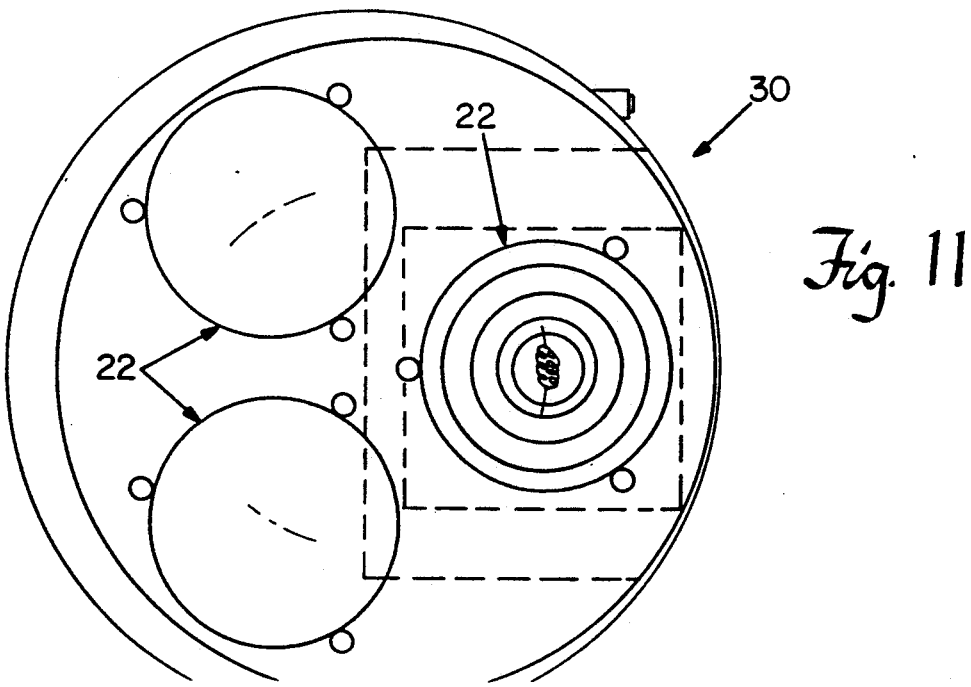

This structure of the funnels 22 in accordance with the invention enables them to be stacked up nested inside each other without crushing them and also enables them to be dispensed one by one by gravity, around an ultra-violet lamp 28 adapted to maintain sterile conditions, by means of a cam device 29 in a funnel dispenser 30 with a tilting door 31 as shown in FIGS. 9 through 11.

The main advantage of a filter device using a support and funnel in accordance with the invention is the easy access to the edges of the filter membrane after filtration (see FIG. 3).

The offset between the upper surfaces of the central and peripheral support sections 3 and 4 allows deformation of the edges of the filter membrane 2 as shown in FIG. 4, which facilitates contact between the convex central part of the membrane 2 and the culture medium 32, as shown in FIG. 5.

The fact that the upper surface 5 of the peripheral part 4 of the support is roughened means that the vacuum is broken as soon as the funnel 22 is released from the support, without requiring any separate operation.

All these advantages mean that the device in accordance with the present invention can facilitate the microbiological analysis of liquid samples and in particular make it easier to handle a filter membrane which adheres strongly to its support and its particularly difficult to detach when wet, for transfer onto a culture medium, with a view to detecting any microorganisms collected on the membrane.

I claim:

1. A support apparatus for a filter membrane which comprises a central porous support section and a peripheral support section, said central porous support section adapted to support a central portion of a filter membrane and said peripheral support section adapted to support a peripheral portion of a filter membrane, a base support for said central support section and said peripheral support section, and means integral to said apparatus for sufficiently separating said central porous support section from said peripheral support section for enabling said filter to be detached intact from said peripheral support section and to be grasped by its edge intact during handling.

2. The apparatus of claim 1 wherein said central porous support section includes a first top surface adapted to contact a central portion of a filter membrane and said peripheral support includes a second top surface adapted to contact a peripheral portion of a filter membrane, said first top surface being slightly separated from said second top surface to permit a filter membrane to contact said first top surface and said second top surface while avoiding rapture of said filter membrane when a subatmospheric pressure is imposed on said filter membrane through said central porous support section.

3. The apparatus of claim 1 wherein the means for separating said central porous support section from said peripheral support section comprises a plunger, said plunger being positioned on said base support for said central porous section and being adapted to move to effect separation of said central porous support section from said peripheral support section.

4. The apparatus of claim 2 wherein the means for separating said central porous support section from said peripheral support section comprises a plunger, said plunger being positioned on said base support for said central porous section and being adapted to move to effect separation of said central porous support section from said peripheral support section.

5. The support apparatus of claim 1 wherein said peripheral support section includes a groove on an outside surface substantially perpendicular to a top surface of said peripheral support section.

6. The support apparatus of claim 2 wherein said peripheral support section includes a groove on an outside surface substantially perpendicular to a top surface of said peripheral support section.

7. The support apparatus of claim 3 wherein said peripheral support section includes a groove on an outside surface substantially perpendicular to a top surface of said peripheral support section.

8. The support apparatus of claim 4 wherein said peripheral support section includes a groove on an outside surface substantially perpendicular to a top surface of said peripheral support section.

9. The apparatus of claim 1 wherein a top surface of said peripheral support section is roughened.

10. The apparatus of claim 2 wherein a top surface of said peripheral support section is roughened.

11. The apparatus of claim 3 wherein a top surface of said peripheral support section is roughened.

12. The apparatus of claim 4 wherein a top surface of said peripheral support section is roughened.

13. The apparatus of claim 5 wherein a top surface of said peripheral support section is roughened.

14. The apparatus of claim 6 wherein a top surface of said peripheral support section is roughened.

15. The apparatus of claim 7 wherein a top surface of said peripheral support section is roughened.

16. The apparatus of claim 8 wherein a top surface of said peripheral support section is roughened.

17. An apparatus for filtering a liquid which comprises the support apparatus of claim 1 and a funnel, said funnel including a frustconical section having a base adjacent said peripheral support section, a sealing lip extending radially inward from a wall of said frustoconical section and positioned to contact and seal a filter membrane on said peripheral support section, and means to secure said base to said peripheral support section.

18. An apparatus for filtering a liquid which comprises the support apparatus of claim 2 and a funnel, said funnel including a frustconical section having a base adjacent said peripheral support section, a sealing lip extending radially inward from a wall of said frustoconical section and positioned to contact and seal a filter membrane on said peripheral support section, and means to secure said base to said peripheral support section.

19. An apparatus for filtering a liquid which comprises the support apparatus of claim 3 and a funnel, said funnel including a frustconical section having a base adjacent said peripheral support section, a sealing lip extending radially inward from a wall of said frustoconical section and positioned to contact and seal a filter membrane on said peripheral support section, and means to secure said base to said peripheral support section.

20. An apparatus for filtering a liquid which comprises the support apparatus of claim 4 and a funnel, said funnel including a frustconical section having a base adjacent said peripheral support section, a sealing lip extending radially inward from a wall of said frustoconical section and positioned to contact and seal a filter membrane on said peripheral support section, and means to secure said base to said peripheral support section.

21. An apparatus for filtering a liquid which comprises the support apparatus of claim 5 and a funnel, said funnel including a frustoconical section having a base adjacent said peripheral support section, a sealing lip extending radially inward from a wall of said frustoconical section and positioned to contact and seal a filter membrane on said peripheral support section, and a ring positioned on a cylindrical section adjacent said sealing lip, said ring adapted to fit within the groove on said peripheral support section.

22. An apparatus for filtering a liquid which comprises the support apparatus of claim 6 and a funnel, said funnel including a frustoconical section having a base adjacent said peripheral support section, a sealing lip extending radially inward from a wall of said frustoconical section and positioned to contact and seal a filter membrane on said peripheral support section, and a ring positioned on a cylindrical section adjacent said sealing lip, said ring adapted to fit within the groove on said peripheral support section.

23. An apparatus for filtering a liquid which comprises the support apparatus of claim 7 and a funnel, said funnel including a frustoconical section having a base adjacent said peripheral support section, a sealing lip extending radially inward from a wall of said frustoconical section and positioned to contact and seal a filter membrane on said peripheral support section, and a ring positioned on a cylindrical section adjacent said sealing lip, said ring adapted to fit within the groove on said peripheral support section.

24. An apparatus for filtering a liquid which comprises the support apparatus of claim 8 and a funnel, said funnel including a frustoconical section having a base adjacent said peripheral support section, a sealing lip extending radially inward from a wall of said frustoconical section and positioned to contact and seal a filter membrane on said peripheral support section, and a ring positioned on a cylindrical section adjacent said sealing lip, said ring adapted to fit within the groove on said peripheral support section.

* * * * *